United States Patent [19]
Clark

[11] 4,150,460
[45] Apr. 24, 1979

[54] FISH HOLDER WITH ROTATABLE CLAMPING JAWS

[75] Inventor: V. Doyne Clark, Faulkner County, Ark.

[73] Assignee: Carrol Herring, Quitman, Ark. ; a part interest

[21] Appl. No.: 894,443

[22] Filed: Apr. 7, 1978

[51] Int. Cl.² .......................... A22C 25/06; A22C 25/17
[52] U.S. Cl. .......................................................... 17/70
[58] Field of Search ...................... 17/70; 81/302, 347, 81/357, 359, 386

[56] References Cited

U.S. PATENT DOCUMENTS

| | | | |
|---|---|---|---|
| 2,680,877 | 6/1954 | Thornton | 17/70 |
| 2,891,275 | 6/1959 | Schuls | 17/70 |
| 3,343,432 | 9/1967 | Nagy | 81/357 X |
| 3,518,719 | 7/1970 | Anderson | 17/70 |

Primary Examiner—Willie G. Abercrombie
Attorney, Agent, or Firm—Ralph R. Pittman

[57] ABSTRACT

A fish holder, particularly adapted for facilitating skinning of catfish, has an inner elongate stationary member upon which an outer coextensive cylinder is rotatably mounted. In use, a pair of clamping jaws at the outer end of the outer cylinder into which the head of a fish may be inserted in a horizontal direction hold the depending fish in position for dressing one side of the body portion. The outer cylinder, with the fish held in the jaws, may then be rotated one-half turn, which movement automatically positions the other side of the body portion in position to enable completion of the dressing operation. The jaws are manually operable and selectively lockable in a plurality of angular positions.

12 Claims, 7 Drawing Figures

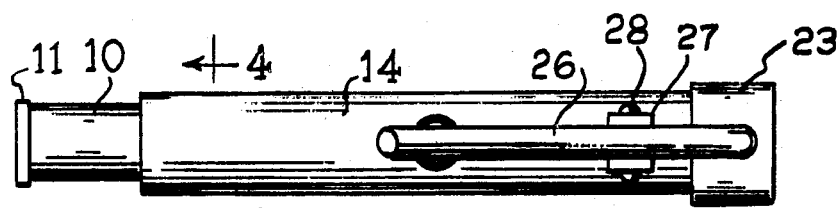
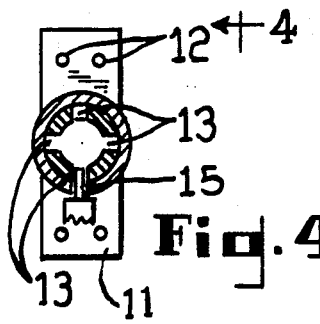
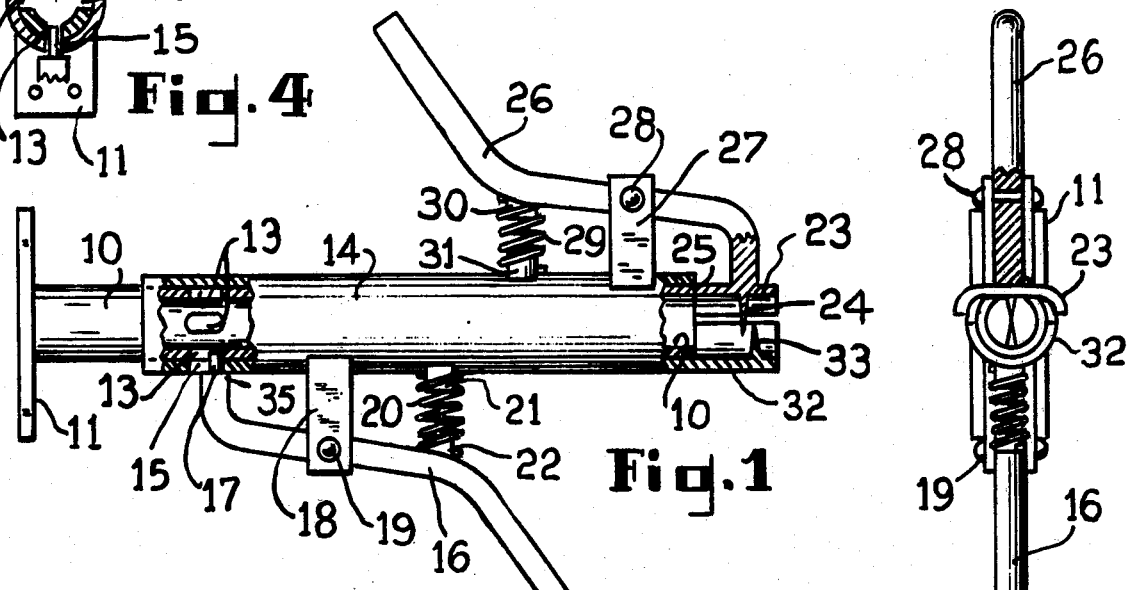
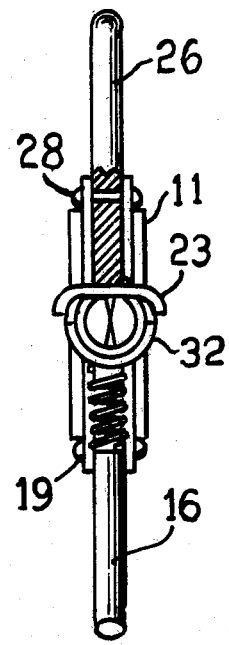
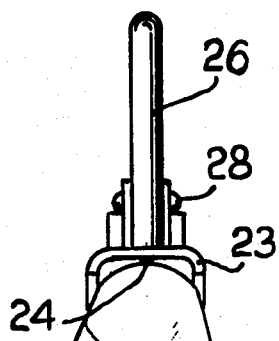
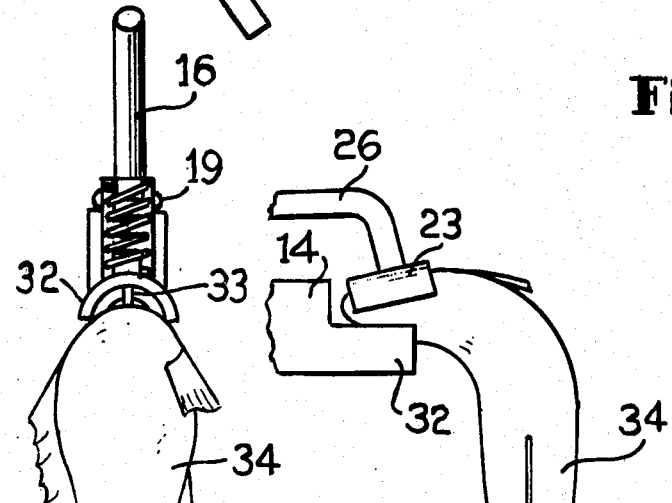

FISH HOLDER WITH ROTATABLE CLAMPING JAWS

BACKGROUND OF THE INVENTION

Descriptions of many structures for holding fish or other small craniates during a dressing out procedure appear in the prior art. These structures generally require fastening the fish to some sort of flat surface, such as a board. Certain other disclosures show a fish held from its ends, or impaled on a bayonet associated with some additional member. While numerous prior art devices appear useful in the cleaning and dressing operation, a reduction of the considerable amount of manual handling of the fish, such as that during unclamping and reclamping of the carcass, should further facilitate the dressing process.

It has been found that the depending body portion of a fish having its head clamped in a horizontal posture may be turned to present any part of the body portion to an operator by rotating the clamped head about a horizontal axis. This procedure completely obviates all manual handling of the carcass except its attachment and removal from the holder.

SUMMARY OF THE INVENTION

A pair of coacting clamping jaw are located at an end of an elongate tubular cylinder, and the cylinder is slip-fitted for slidable rotatable movement on an inner stationary horizontally disposed cylindrical shaft. A centrally disposed fang projects from the interior surface of each of the jaws, and the jaws are spring-biased to a closed position and openable by manipulating an associated handle on the outer cylinder.

A pivotally mounted, spring-biased latch bolt is also mounted on the outer cylinder, one end of which is radially movable therethrough to selective engagement with any one of a plurality of cavities in the cylindrical shaft, thereby enabling the jaws, which are rigidly fixed on the outer cylinder, to be locked in a corresponding number of angular positions about a horizontal axis.

BRIEF DESCRIPTION OF THE DRAWING

FIG. 1 is a side elevational view of the holder, some parts being broken away to reveal certain internal structural elements;

FIG. 2 is a plan view of the holder;

FIG. 3 is a front view of the holder;

FIG. 4 is a sectional view indicated by the line 4—4 of FIG. 2;

FIG. 5 is a fragmentary view, showing a fish being held in one position for a dressing out procedure;

FIG. 6 is a front view, showing one side of the held fish facing forward; and

FIG. 7 is another front view, showing the other side of the fish facing forward as the result on one-half turn of the outer rotatable cylinder about its horizontal axis.

DESCRIPTION OF THE PREFERRED EMBODIMENT

Referring to the drawing, FIGS. 1, 2, 3 and 4 show the holder as it appears when not in use; FIGS. 5, 6 and 7 illustrate the holder in a fish-holding configuration. The holder includes two principal separable members, namely an inner elongate cylindrical support shaft 10, and an outer coextensive tubular cylinder 14 slip-fitted thereon and slidably rotatable thereabout.

An escutcheon mounting plate 11 is rigidly secured, as by welding, to the inner end of the support shaft 10, the holes 12 through the plate being provided for the passage of fasteners for attaching the shaft 10 in a fixed cantilever position to a vertical surface.

A semi-cylindrical coextensive portion 32 of the rotatable tubular cylinder 14 projects outwardly beyond the outer end of the shaft 10 for utilization as one jaw of a pair, and a swingably movable superposed jaw 23 completes the pair, thereby providing open end coacting jaws at the outer end of the holder.

A handle 26 is attached to the top of the movable jaw 23, extending first radially therefrom and thence outwardly along and in spaced relationship with the cylinder 14. At a location intermediate its ends, the handle 26 passes between the pair of parallel outwardly extending transversely spaced support members 27, upon which it is pivotally mounted by the pivot pin 28.

A compressed open helical spring 29 is interposed between a rearward portion of the handle 26, and the radially spaced lugs 30 and 31, attached respectively to the handle 26 and the cylinder 14, are encompassed by the ends of the spring 29, thereby retaining and guiding the spring 29 during its movement.

The swingable jaw 23 has the shape of a flattened oblongated semi-cylinder, the top flattened portion abutting an end portion of the shaft 10 as indicated at the numeral 25, for the purpose of limiting the inward longitudinal movement of the cylinder 14 along the shaft 10. The lateral sides of the jaw 23 extend transversely beyond the sides of the adjacent relatively stationary jaw 32, and the linearly offset fangs 24 and 33 project respectively downward from the roof of the jaw 23 and upward from the floor of the jaw 32.

Adjacent to the inner end portions of the cylinder 14 and the enclosed shaft 10 a plurality of circumferentially spaced latch-receiving cavities 13 in the shaft, and a single opening 15 through the wall of the rotatable tubular cylinder 14 are positioned, along a diametral plane. This relationship of the cylinder opening 15 to the cavities 13 enables the registration of the opening 15 with any selected cavity 13 by rotating the cylinder 14 through the appropriate angle.

To enable selective latching of the cylinder 14 to the shaft 10, a reduced-diameter end portion 17 of the latch bolt 16 extends radially inward into the opening 15 and one of the registering cavities 13. From its associated cavity 13, the latch bolt 16 extends first radially outward a short distance and thence in spaced relationship along the outside of the cylinder 14.

Intermediate its ends the latch bolt 16 passes between the pair of parallel outwardly directed transversely spaced support members 18, the latch bolt 16 being pivotally mounted on the transversely extending pivot pin 19. A compressed open helical spring 20 is disposed between a forward portion of the latch bolt 16 and the outside of the cylinder 14; the radially spaced lugs 21 and 22, projecting respectively from the latch bolt 16 and the cylinder 14, extend into the ends of the spring 20 to both guide its movement and retain it on the structure.

Unlatching of the cylinder 14 from the shaft 10 is effected by outwardly swinging the engaging portion 17 from the associated registering openings. To permit such swingable movement, the opening 14 and the cavities 13 are all longitudinally oblongated, and to provide a limit stop of latch bolt movement, a forward portion 35 of the margin of the conjoining bolt portion is positioned to engage the cylinder adjacent to the opening 15.

The jaw 23 is reciprocably movable against the continuous bias of the spring 29, and similarly, the latch pin 17 is reciprocably movable against the continuous bias of the spring 20.

In operation, the outermost end of the jaw handle 26 is pressed toward the cylinder 14, moving the jaw 23 to the open position. The head of the fish is inserted endwise between the jaws, and upon release of the handle the fangs 24 and 33 penetrate the head and the head portion of the fish is securely clamped in the jaws, as shown at FIG. 5. In this situation, one side of the depending fish faces forwardly from the holder, as indicated at FIG. 6.

Following completion of the required cleaning operation at the first forwardly facing side of the fish, the outer end of the latch bolt is pressed to release the outer cylinder from the shaft, and the cylinder, with the fish 34 clamped thereto, rotated to and latched in the half turn position. This action inverts the clamping jaws and moves the rearward uncleaned side of the fish to the forwardly facing orientation. FIG. 6 shows the initial posture of the depending fish, and FIG. 7 shows the oppositely facing posture following a one-half turn of the cylinder and the concurrent inversion of the clamping jaws.

It is noted that the stationary supporting shaft may be provided with more than the two latch-receiving cavities needed for the one-half turn operation described above. The use of other angular displacements may be desirable for certain fish or other small game dressing out procedures; the drawing at FIG. 1 shows latch-receiving cavities spaced at 90 degree intervals.

For the purpose of clarity, the holder has been described herein in connection with the dressing procedures applying to fish, but it is believed apparent that the use of the holder is not so limited, since it may be equally useful in dressing out any small game the bodies of which will assume like positions when suspended from a horizontally directed head portion.

What is claimed is:

1. A holder for facilitating the dressing of fish and small game, said holder being adapted for use in a cantilever position and comprising:
   an inner stationary elongate cylindrical support shaft;
   an outer rotatably movable tubular cylinder fitted on said shaft in slidable engagement therewith;
   coacting upper and lower jaws disposed at the outer end of said rotatably movable cylinder, the upper jaw being reciprocably movable between closed and open positions with respect to said lower jaw;
   spaced first and second manually operable means secured exteriorly on said outer cylinder;
   said first manually operable means being operable to effect reciprocable movement of said upper jaw; and
   said second manually operable means being operable to effect a predetermined rotary movement of said outer cylinder about said inner support shaft.

2. The holder claimed in claim 1, in which a portion of said upper jaw is interposed in the path of inward longitudinal axial movement of said outer rotatably movable cylinder.

3. The holder claimed in claim 1, wherein said inner support shaft and said outer cylinder are coaxially positioned in coextensive concentric relationship.

4. The holder claimed in claim 1, in which said lower jaw is a semi-cylindrical outwardly projecting portion of said outer tubular cylinder.

5. The holder claimed in claim 1, wherein said upper jaw is a flattened semi-cylindrical member and is spatially superposed above said lower jaw.

6. The holder claimed in claim 1, wherein a first lower fang projects upwardly from the interior surface of said lower jaw and a second upper fang projects downwardly from the interior surface of said upper jaw.

7. The holder claimed in claim 1, in which said first manually operable means includes a pivotally mounted intermedially fulcrumed handle and an associated spring continuously biasing said upper jaw to the closed position.

8. The holder claimed in claim 1, in which said second manually operable means includes an intermediately fulcrumed pivotally mounted latch bolt having an end portion movable to interlock said cylinder and said shaft, and spring means continuously biasing said latch bolt to the interlock position.

9. A holder for facilitating the dressing of fish and small game, said holder being adapted for use in a horizontal position and comprising:
   an elongate stationary inner cylinder and a coextensive outer cylinder rotatably mounted thereon;
   coacting upper and lower jaws located at one end of said outer cylinder, said jaws projecting outwardly beyond the adjacent end of said inner cylinder and the upper jaw being reciprocably movable between a closed and an open position with respect to said lower jaw;
   longitudinally and circumferentially spaced first and second manually operable means secured along the exterior of said outer cylinder;
   said first manually operable means being operable to effect reciprocable movement of said upper jaw and said second manually operable means being operable to effect rotary movement of said outer cylinder about said inner cylinder;
   a single radially directed opening in the wall of said outer cylinder;
   a plurality of circumferentially spaced latch-receiving cavities extending inwardly from the outer surface of said inner cylinder;
   said opening and all of said cavities being located along a diametral plane normal to the axis of said inner cylinder whereby said cavities sequentially register with said single opening upon rotation of said outer cylinder, said single opening and any registered cavity being disposed in the path of movement of a portion of said second manually operable means.

10. The holder claimed in claim 9, wherein said second manually operable means includes an intermediately fulcrumed pivotally mounted elongate latch bolt having an end portion contoured for movement into the radially registering openings in said inner and outer cylinders for interlocking the cylinders, and spring means selectively holding said latch bolt in the interlocking position.

11. The holder claimed in claim 9, wherein said single opening and all of said cavities are linearly oblongated along the associated cylinder.

12. The holder claimed in claim 9, wherein said second manually operable means includes an intermediately fulcrumed pivotally mounted latch bolt having an end portion contoured for movement into the radially registering openings in said inner and outer cylinders for interlocking the cylinders, the end portion of said latch bolt being abruptly reduced to define a concentric coextensive projection, the movement of said latch bolt being such as to permit entrance of said reduced projection into said registered openings for a distance limited by the engagement of an adjoining unreduced portion of said latch bolt with a portion of the outer cylinder adjoining said single opening.

* * * * *